(12) United States Patent
Sheets et al.

(10) Patent No.: US 9,390,445 B2
(45) Date of Patent: Jul. 12, 2016

(54) AUTHENTICATION USING BIOMETRIC TECHNOLOGY THROUGH A CONSUMER DEVICE

(71) Applicant: Visa International Service Association, San Francisco, CA (US)

(72) Inventors: John F. Sheets, San Francisco, CA (US); Kim R. Wagner, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 112 days.

(21) Appl. No.: 13/899,496

(22) Filed: May 21, 2013

(65) Prior Publication Data

US 2013/0290136 A1      Oct. 31, 2013

Related U.S. Application Data

(63) Continuation-in-part of application No. 13/785,956, filed on Mar. 5, 2013.

(60) Provisional application No. 61/606,892, filed on Mar. 5, 2012.

(51) Int. Cl.
```
G06F 7/04      (2006.01)
G06Q 30/06     (2012.01)
G06Q 20/40     (2012.01)
```
(52) U.S. Cl.
CPC ........ *G06Q 30/0609* (2013.01); *G06Q 20/4016* (2013.01); *G06Q 20/40145* (2013.01)

(58) Field of Classification Search
USPC ............................................................ 726/2
See application file for complete search history.

(56) References Cited

U.S. PATENT DOCUMENTS

| 5,608,784 A | 3/1997 | Miller |
| 5,675,704 A | 10/1997 | Juang et al. |

(Continued)

FOREIGN PATENT DOCUMENTS

| JP | 2010-191680 A | 9/2010 |
| KR | 10-2003-063762 A | 7/2003 |
| KR | 10-2008-0032813 A | 4/2008 |

OTHER PUBLICATIONS

U.S. Appl. No. 13/785,956, filed Mar. 5, 2013.

(Continued)

*Primary Examiner* — Zeshan Qayyum
(74) *Attorney, Agent, or Firm* — Kilpatrick Townsend & Stockton LLP

(57) ABSTRACT

Embodiments of the invention provide strong user authentication on a consumer device without requiring the user to go through a formal registration process with the issuer or processing network. Certain embodiments allow the use of any biometric technology (e.g., fingerprint scan, iris scan, voice recognition, etc.) supported by their consumer device (e.g., smart phone, tablet computer, personal computer) to authenticate the user. Additionally, the consumer device provides unforgeable evidence of the biometric match in the form of a biometric digital artifact to provide proof to a processing network that the match occurred. The processing network maintains a history of these authenticated transactions and biometric digital artifacts and as more and more non-fraudulent authenticated transactions occur over time, a higher level of trust (i.e., lower risk) is associated with the consumer device, biometric registration process, and the user.

12 Claims, 10 Drawing Sheets

(56) References Cited

U.S. PATENT DOCUMENTS

| | | | |
|---|---|---|---|
| 5,719,921 A | 2/1998 | Vysotsky et al. | |
| 5,839,103 A | 11/1998 | Mammone et al. | |
| 5,870,723 A * | 2/1999 | Pare, Jr. | G06F 21/32 705/39 |
| 5,995,927 A | 11/1999 | Li | |
| 6,167,517 A * | 12/2000 | Gilchrist | G06F 21/32 713/182 |
| 6,249,807 B1 * | 6/2001 | Shaw | G06F 17/30011 379/256 |
| 6,266,640 B1 | 7/2001 | Fromm | |
| 6,349,279 B1 | 2/2002 | Montacie et al. | |
| 6,529,871 B1 | 3/2003 | Kanevsky et al. | |
| 6,556,969 B1 | 4/2003 | Asadi et al. | |
| 6,697,778 B1 | 2/2004 | Kuhn et al. | |
| 6,799,162 B1 | 9/2004 | Goronzy et al. | |
| 6,804,647 B1 | 10/2004 | Heck et al. | |
| 6,819,219 B1 | 11/2004 | Bolle et al. | |
| 6,836,540 B2 * | 12/2004 | Falcone et al. | 379/127.02 |
| 6,973,426 B1 | 12/2005 | Schier et al. | |
| 7,409,343 B2 | 8/2008 | Charlet | |
| 7,801,288 B2 | 9/2010 | Wasserblat et al. | |
| 7,949,609 B2 * | 5/2011 | Colella | G06Q 20/382 235/380 |
| 8,694,315 B1 | 4/2014 | Sheets et al. | |
| 2002/0087893 A1 | 7/2002 | Shpiro et al. | |
| 2003/0009333 A1 | 1/2003 | Sharma et al. | |
| 2003/0046072 A1 | 3/2003 | Ramaswamy et al. | |
| 2004/0107099 A1 | 6/2004 | Charlet | |
| 2004/0162726 A1 | 8/2004 | Chang | |
| 2004/0186724 A1 | 9/2004 | Morin | |
| 2004/0230420 A1 | 11/2004 | Kadambe et al. | |
| 2004/0232221 A1 | 11/2004 | Beenau et al. | |
| 2005/0071168 A1 | 3/2005 | Juang et al. | |
| 2005/0185779 A1 | 8/2005 | Toms | |
| 2007/0174206 A1 | 7/2007 | Colella | |
| 2007/0219801 A1 | 9/2007 | Sundaram et al. | |
| 2007/0250924 A1 | 10/2007 | Ono et al. | |
| 2007/0255564 A1 | 11/2007 | Yee et al. | |
| 2007/0288759 A1 | 12/2007 | Wood et al. | |
| 2008/0082451 A1 | 4/2008 | Schneider et al. | |
| 2008/0107308 A1 * | 5/2008 | Ward | G06F 19/322 382/115 |
| 2008/0148059 A1 | 6/2008 | Shapiro | |
| 2009/0157454 A1 | 6/2009 | Carter et al. | |
| 2009/0233579 A1 | 9/2009 | Castell et al. | |
| 2009/0276733 A1 | 11/2009 | Manyam et al. | |
| 2010/0086108 A1 | 4/2010 | Jaiswal et al. | |
| 2010/0106502 A1 | 4/2010 | Farrell et al. | |
| 2010/0106503 A1 | 4/2010 | Farrell et al. | |
| 2010/0180127 A1 | 7/2010 | Li et al. | |
| 2011/0119141 A1 | 5/2011 | Hoyos et al. | |
| 2011/0142234 A1 | 6/2011 | Rogers | |
| 2012/0130714 A1 | 5/2012 | Zeljkovic et al. | |
| 2012/0253805 A1 | 10/2012 | Rajakumar et al. | |
| 2013/0006784 A1 | 1/2013 | Krauss et al. | |
| 2013/0132091 A1 | 5/2013 | Skerpac | |
| 2013/0173268 A1 | 7/2013 | Weng et al. | |
| 2013/0195285 A1 | 8/2013 | De La Fuente et al. | |
| 2013/0232073 A1 | 9/2013 | Sheets et al. | |

OTHER PUBLICATIONS

International Search Report and Written Opinion for International Patent Application No. PCT/US/029177, mailed on Jun. 27, 2013, 11 pages.

Non-Final Office Action for U.S. Appl. No. 13/899,470, mailed on Sep. 5, 2013, 12 pages.

Notice of Allowance for U.S. Appl. No. 13/899,470, mailed on Nov. 25, 2013, 18 pages.

U.S. Appl. No. 13/899,470, filed May 21, 2013.

International Preliminary Report on Patentability for International Patent Application No. PCT/US2013/029177, mailed on Sep. 18, 2014, 10 pages.

International Search Report and Written Opinion for International Patent Application No. PCT/US2013/077075 mailed on Apr. 21, 2014, 20 pages.

Non-Final Office Action for U.S. Appl. No. 13/785,956, mailed on Jan. 13, 2015, 28 pages.

European Extended Search Report for European Patent Application No. 13758679.8, mailed Apr. 9, 2015, 7 pages.

Notice of Allowance for U.S. Appl. No. 14/167,793, mailed on Apr. 22, 2015, 15 pages.

Final Office Action for U.S. Appl. No. 13/785,956, mailed on Apr. 30, 2015, 11 pages.

* cited by examiner

AUTHENTICATION USING BIOMETRIC TECHNOLOGY THROUGH A CONSUMER DEVICE

CROSS-REFERENCES TO RELATED APPLICATIONS

The present application is a continuation-in-part of and claims priority to U.S. patent application Ser. No. 13/785,586, filed on Mar. 5, 2013, which is a non-provisional application of and claims priority to U.S. Provisional Application No. 61/606,892, filed on Mar. 5, 2012, the entire contents of which are herein incorporated by reference for all purposes.

BACKGROUND

Fraud in the consumer transaction service industry is a problem. For instance, lately, many consumer transactions may be completed using a consumer device (e.g., mobile phone) without the use of a physical payment card. A user may initiate a payment transaction from a consumer device at a point-of-sale terminal or in a remote payment environment. Some consumer device initiated transactions without a physical payment card may require biometric authentication to verify the identity of the payment user. However, in some cases a forger can duplicate the user biometric and complete a fraudulent transaction using the payment card details of the payment user.

Additionally, inconvenience and inefficiency are other problems associated with biometric authentication. Biometric authentication may require long processing times due to having to accurately match the user biometric data against a database of the user's registered biometric data. This delay in processing may cause inconvenience for the user who wishes to complete the transaction from the consumer device. Furthermore, the hosting of biometric data for millions of consumers on a central computer would be daunting along with risks and liabilities of having all biometric data in a central location.

Embodiments of the invention address these and other problems.

SUMMARY

Embodiments of the invention broadly described, allow for user authentication using biometric technology through a consumer device. More specifically, the invention pertains to transactions initiated from a consumer device, such as a mobile phone or personal computer, for both face-to-face and remote payment environments.

Embodiments of the invention relate to systems and methods for authenticating a user at a consumer device and authenticating a user at a server computer. Embodiments of the invention provide strong user authentication on a trusted consumer device without requiring the user to go through a formal registration process with the issuer or payment processing network. Certain embodiments allow the use of any biometric technology (e.g., fingerprint scan, iris scan, voice recognition, etc.) supported by their consumer device (e.g., smart phone, tablet computer) to authenticate the user. Additionally, the consumer device provides unforgeable evidence of the biometric match in the form of a unique digital signature to provide proof to a payment processing network that the match occurred. The payment processing network maintains a history of these authenticated transactions and unique digital signatures and as more and more non-fraudulent authenticated transactions occur over time, a higher level of trust (i.e., lower risk) is associated with the consumer device, biometric registration process, and the user.

In certain embodiments, the consumer device supports biometric capability via a dedicated sensor (e.g., fingerprint reader) or existing sensor (e.g., camera or microphone for iris recognition, voice recognition, etc.). The user registers their biometric data locally on the consumer device using software that provides this service. When a payment transaction requiring user authentication is to be performed, the user performs the necessary step(s) to have their biometric read (e.g., swipe their finger on the fingerprint sensor, speak into a microphone, etc.). In some embodiments, the biometric software performs the match on the device and uses an algorithm to generate a unique biometric digital artifact based on the biometric authentication. Any suitable artifact generation algorithm can be used. The artifact is verifiable by a server computer in a payment processing network and is unique with each transaction. The consumer device transmits the unique biometric digital artifact to the payment processing network along with the consumer device's disposition (e.g., biometric match or no match). The payment processing network verifies the artifact and records the fact that this verification occurred. In some embodiments, each time the user performs a transaction, this verification step occurs. Over time, this particular user authentication process is trusted more and more as long as the account remains non-fraudulent. The trust increases on each subsequent transaction as long as the consumer device consistently provides unique data that continues to be verified. This process provides strong proof that the biometric matching is occurring and the user is indeed performing the transactions.

One embodiment of the invention discloses a computer implemented method for authenticating a user at a consumer device, comprising: receiving a first biometric data of a user; comparing the first biometric data with a second biometric data of the user; determining, from the comparison, whether the first biometric data and the second biometric data match according to a predetermined threshold; and creating a biometric digital artifact based on the first biometric data, wherein the biometric digital artifact includes information regarding a type of biometric data received and the determination.

One embodiment of the invention discloses a computer-implemented method for authenticating a user at a server computer, comprising: receiving payment information and a biometric digital artifact, wherein the biometric digital artifact is generated by a consumer device and comprises information regarding a type of biometric data, and a determination of a data match between a first biometric data of a user and a second biometric data of a user; holding the biometric digital artifact in a queue for a predetermined period of time; determining that the biometric digital artifact is valid; and updating a user profile with the biometric digital artifact based on the determination.

Further details regarding embodiments of the invention can be found in the Detailed Description and the Figures.

DETAILED DESCRIPTION

Figure 1:
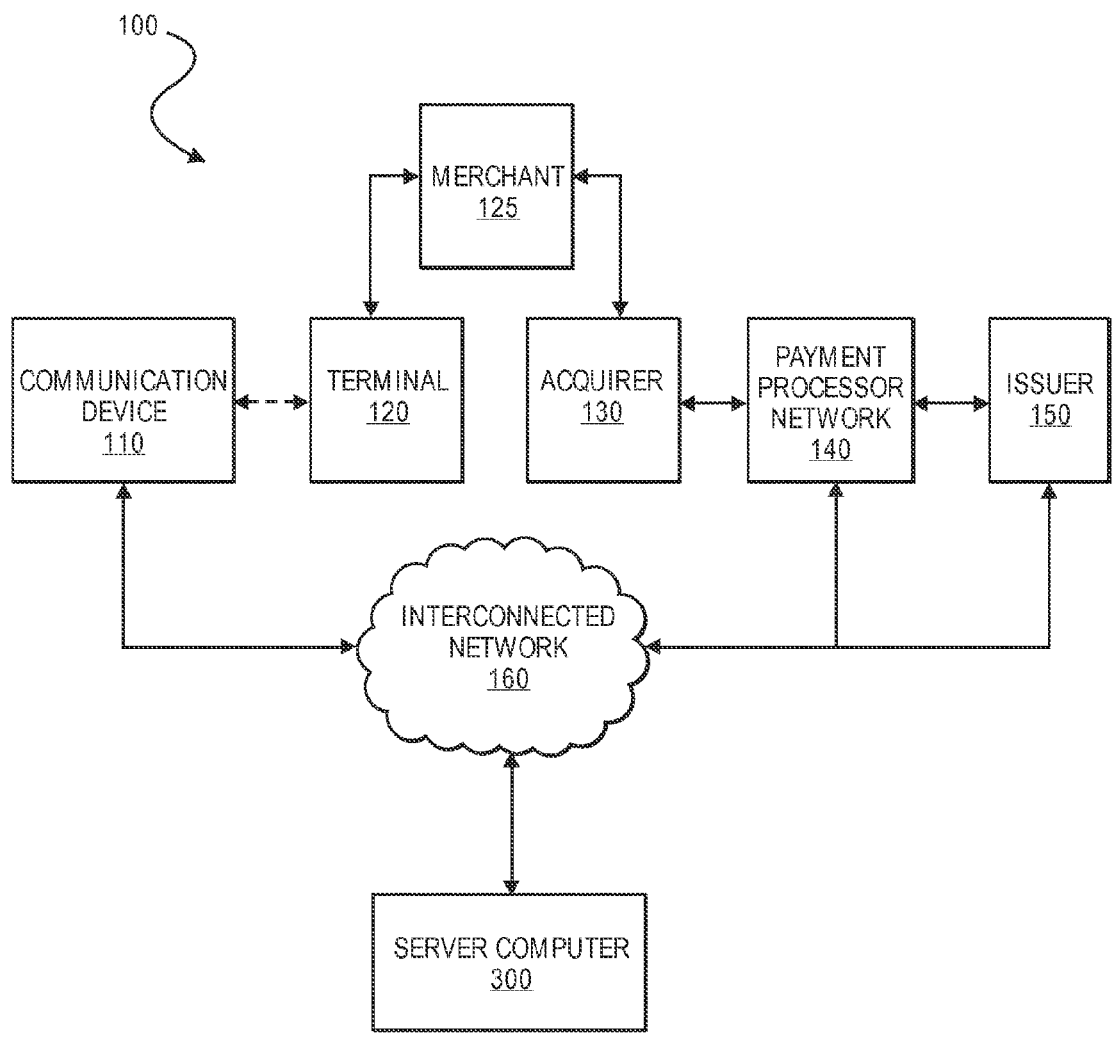
FIG. 1 is a block diagram of a payment system, according to an embodiment of the present invention.

Prior to discussing the specific embodiments of the invention, a further description of some terms can be provided for a better understanding of embodiments of the invention.

A "payment device" may include any suitable device capable of making a payment. For example, a payment device can include a card including a credit card, debit card, charge card, gift card, or any combination thereof. A payment device can be used in conjunction with a consumer device, as further defined below.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services.

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

As used herein, a "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of a secure socket layer (SSL) session. However, any method of creating a secure channel may be used. By establishing a secure channel, sensitive information related to a payment device (such as account numbers, CVV values, expiration dates, etc.) may be securely transmitted between the two or more entities to facilitate a transaction.

A "server computer" can be a powerful computer or a cluster of computers. For example, the server computer can be a large mainframe, a minicomputer cluster, or a group of servers functioning as a unit. In one example, the server computer may be a database server coupled to a Web server.

A "terminal" (e.g. a point-of-service (POS) terminal) can be any suitable device configured to process payment transactions such as credit card or debit card transactions, or electronic settlement transactions, and may have optical, electrical, or magnetic readers for reading data from other portable consumer devices such as smart cards, keychain device, cell phones, payment cards, security cards, access cards, and the like.

An "acquirer" is a business entity (e.g., a commercial bank) that typically has a business relationship with the merchant and receives some or all of the transactions from that merchant.

An "issuer" is a business entity which issues a card to a user. Typically, an issuer is a financial institution.

A "cardholder" is an individual who is authorized to use a payment card issued by the issuer. The terms "cardholder" and "user" may be used interchangeably in the following description. A "user" and/or "cardholder" may be any competent individual.

"Biometric data" includes data that can be used to uniquely identify an individual based upon one or more intrinsic physical or behavioral traits. For example, biometric data may include fingerprint data and retinal scan data. Further examples of biometric data include digital photographic data (e.g., facial recognition data), deoxyribonucleic acid (DNA) data, palm print data, hand geometry data, and iris recognition data, A "predetermined correlation," as described herein, can be a relationship between received input data and stored data. In the context of the present invention, the received input data can be a first set of biometric data from a user. The stored data can be a previously stored biometric data of the user. The predetermined correlation can be a previously set threshold that identifies or quantifies to what degree the received input data and the previously stored input data should match. If the received input data and the previously stored input data match according to the predetermined threshold or "correlation", then the data is considered a match. Alternatively, the correlation can determine a "risk factor" associated with the input data. A high correlation can constitute a low risk factor and a low correlation can constitute a high risk factor. To illustrate correlation, fingerprints, for example, contain a certain number of identifying features. If a high number of identifying features of a fingerprint are matched to a stored fingerprint, then the probability that both fingerprints are from the same person may be high (e.g., low risk). Similarly, if few identifying features match between the two fingerprints, then the probability that they are from the same person is low (e.g., high risk). Setting the appropriate threshold to ensure an acceptable level of accuracy would be appreciated by one of ordinary skill in the art. This concept can be applied to other biometric data (e.g., retinal scans, facial recognition data, etc.).

A "biometric digital artifact," as described herein, can be a digital artifact or cryptographically generated value that provides information identifying a type of biometric used in an authentication process and whether a biometric match has occurred on a consumer device. The biometric digital artifact (BDA) can be a binary number or, in some embodiments, an analog signal. Each time a consumer device authenticates a user biometric, a new BDA is created by the consumer device that includes enough information to identify the biometric type and authentication result, yet is unique in that fraudulent copies of the BDA can be identified and invalidated. The biometric digital artifact may also be a synthesis of biometric data associated with a user.

A "consumer device," as described herein, can be any consumer electronic device that can execute and/or support payment transaction including, but not limited to, a personal digital assistant (PDA), a smart phone, tablet computer, notebook computer, and the like.

Embodiments of the invention provide strong user authentication on a trusted consumer device without requiring the user to go through a formal registration process with the issuer or payment processing network. Certain embodiments allow the use of any biometric technology (e.g., fingerprint scan, iris scan, voice recognition, etc.) supported by their consumer device (e.g., smart phone, tablet computer) to authenticate the user. Additionally, the consumer device provides unforgeable evidence of the biometric match in the form of a unique digital signature to provide proof to a payment processing network that the match occurred. The payment processing network maintains a history of these authenticated transactions and unique digital signatures and as more and more non-fraudulent authenticated transactions occur over time, a higher level of trust (i.e., lower risk) is associated with the consumer device, biometric registration process, and the user.

In certain embodiments, the consumer device supports a biometric capability via a dedicated sensor (e.g., fingerprint reader) or existing sensor (e.g., camera or microphone for iris recognition, voice recognition, etc.). The user registers their biometric data locally on the consumer device using software that provides this service. When a payment transaction requiring user authentication is to be performed, the user performs the necessary step(s) to have their biometric read (e.g., swipe their finger on the fingerprint sensor, speak into a microphone, etc.). In some embodiments, the biometric software performs the match on the device and uses a proprietary algorithm to generate a unique biometric digital artifact based on the biometric authentication. The biometric digital artifact is verifiable by a payment processing network and is unique with each transaction. The consumer device transmits the unique biometric digital artifact to the payment processing network along with the consumer device's disposition (e.g., biometric match or no match). The server computer in the payment processing network (or other location) verifies the artifact and records the fact that this verification occurred. In some embodiments, each time the user performs a transaction, this verification step occurs. Over time, this particular user authentication process is trusted more and more as long as the account remains non-fraudulent. The trust increases on each subsequent transaction as long as the consumer device consistently provides unique data that continues to be verified. This process provides strong proof that the biometric matching is occurring and the user is indeed performing the transactions.

The above examples highlight only a few of the advantages of using a biometric digital artifact to authenticate a user on a consumer device.

Other advantages of embodiments of the invention relate to technical advantages such as the reduction in data transmission, which results in increased bandwidth over communication networks. For example, because much of the biometric verification processing occurs in a distributed manner (e.g., by using many mobile phones), the need for large computational requirements for a central server computer is reduced. Further, in embodiments of the invention, a digital artifact that is relatively small in size is being transmitted to a central server computer, resulting in fast data transmission. This is compared to the case where a data intensive biometric data sample (e.g., an audio file for a voice sample) is being transmitted through a communication medium.

Other advantages of embodiments of the invention relate to security advantages such as having a server verifying the biometric digital artifact, thereby allowing for capability of detection of compromised consumer devices. Further, since the server does not store the biometric data for consumers, there is reduced liability and risk.

I. Exemplary Systems

FIG. 1 is a block diagram of a payment system 100, according to one embodiment of the present invention. The system 100 includes a consumer device 110, a terminal 120, a merchant 125, an acquirer 130, a payment processing network 140, an issuer 150, and an interconnected network 160. The acquirer 130 may further include an acquirer computer (not shown). The payment processing network 140 may include an authorization and settlement server and/or additional servers (not shown) to carry out the various transactions described herein.

In an embodiment, the consumer device 110 is in electronic communication with the terminal 120. The consumer device 110 can be a personal digital assistant (PDA), a smart phone, tablet computer, notebook computer, or the like, that can execute and/or support payment transactions with a payment system 100. A consumer device 110 can be used in conjunction with a payment device, such as a credit card, debit card, charge card, gift card, or other payment device and/or any combination thereof. The combination of a payment device (e.g., credit card) and the consumer device 110 (e.g., smart phone) can be referred to as the consumer device 110 for illustrative purposes. In other embodiments, the consumer device 110 may be used in conjunction with transactions of currency or points (e.g., points accumulated in a particular software application). In further embodiments, the consumer device 110 may be a wireless device, a contactless device, a magnetic device, or other type of payment device that would be known and appreciated by one of ordinary skill in the art with the benefit of this disclosure. In some embodiments, the consumer device 110 includes software (e.g., application) to perform the various payment transactions, processing user biometric data, and generating a unique digital signature as further described below.

In some embodiments, the user biometric data may include fingerprint data, retinal scan data, digital photograph data (e.g., facial recognition data), DNA data, palm print data, hand geometry data, iris recognition data, or other similar biometric identifier that would be appreciated by one of ordinary skill in the art with the benefit of this disclosure.

The terminal 120 is configured to be in electronic communication with the communication device 110 and the acquirer 130 via a merchant 125. In one embodiment, the terminal 120 is a point-of-service (POS) device. Alternatively, the terminal 120 can be any suitable device configured to process payment transactions such as credit card or debit card transactions, or electronic settlement transactions, and may have optical, electrical, or magnetic readers for reading data from portable consumer electronic devices such as smart cards, keychain device, cell phones, payment cards, security cards, access cards, and the like. In some embodiments, the terminal 120 is located at and controlled by a merchant. For example, the terminal 120 can be a POS device at a grocery store checkout line. In other embodiments, the terminal could be a client computer or a mobile phone in the event that the user is conducting a remote transaction.

The acquirer 130 (e.g., acquirer bank) includes an acquirer computer (not shown). The acquirer computer can be configured to transfer data (e.g., bank identification number (BIN), biometric digital artifact, etc.) and financial information to the payment processing network 140. In some embodiments, the acquirer 130 does not need to be present in the system 100 for the consumer device 110 to transfer the financial and user data to the payment processing network 140. In one non-limiting example, the acquiring bank 130 can additionally check the credentials of the user against a watch list in order to prevent fraud and money laundering schemes, as would be appreciated by one of ordinary skill in the art.

In one embodiment, the payment processing network 140 is VisaNet™ where Visa internal processing (VIP) performs the various payment processing network 140 or multi-lateral switch functions described herein. The payment processing network 140 can include an authorization and settlement server (not shown). The authorization and settlement server ("authorization server") performs payment authorization functions. The authorization server is further configured to send and receive authorization data to the issuer 150. Furthermore, the payment processing network 140 can receive a unique digital signature (e.g., from the payment device 110, terminal 120, or acquirer 130) to determine a risk factor associated with a transaction, as further described below.

In some embodiments, the issuer 150 is a business entity which issues a card to a card holder. Typically, an issuer is a financial institution. The issuer 150 is configured to receive the authorization data from the payment processing network 140 (e.g., the authorization server). The issuer 150 receives authentication data from the authorization server and determines if the user is authorized to perform a given financial transaction (e.g., cash deposit/withdrawal, money transfer, balance inquiry) based on whether the user was authenticated by an identification system.

In some embodiments, the consumer device 110 may be connected to and communicate with the payment processor network 140 via an interconnected network 160. One example of an interconnected network 160 is the Internet. The payment processor network 140 may inform the consumer device 110 when a payment has been successfully processed. In some embodiments, the payment processor network 140 may be connected to and communicate with the terminal 120 via the interconnected network 160. The payment processor network 140 may inform the terminal 120 when a payment has been successfully processed which in turn the terminal 120 may complete the transaction with the consumer device 110.

A server computer 300 is also shown in FIG. 1, and is in operative communication with the interconnected network 160. Details regarding the server computer 300 are provided below.

The interconnected network 160 may comprise one or more of a local area network, a wide area network, a metropolitan area network (MAN), an intranet, the Internet, a Public Land Mobile Network (PLMN), a telephone network, such as the Public Switched Telephone Network (PSTN) or a cellular telephone network (e.g., wireless Global System for Mobile Communications (GSM), wireless Code Division Multiple Access (CDMA), etc.), a VoIP network with mobile and/or fixed locations, a wireline network, or a combination of networks.

In a typical payment transaction in embodiments of the invention, a user may interact with the terminal 120 (e.g., with a payment device such as a payment card, or by entering payment information) to conduct a transaction with the merchant 125. The merchant 125 may be operate a merchant computer, which may route an authorization request message to the acquirer 130, and eventually to the issuer 150 via the payment processing network 140.

The issuer 140 will then determine if the transaction is authorized (e.g., by checking for fraud and/or sufficient funds or credit). The issuer will then transmit an authorization response message to the terminal 120 via the payment processing network 140 and the acquirer 130.

At the end of the day, the transaction is cleared and settled between the acquirer 130 and the issuer 150 by the payment processing network 140.

The description below provides descriptions of other components in the system as well as authentication methods using biometric data. The authentication methods can be performed at any suitable point during the above-described transaction flow. For example, the biometric data authentication method may be performed before or after the user uses a payment device to interact with the terminal 120. If it is afterwards, then the authentication method may be performed when the authorization request message is received by the payment processing network 140 or the issuer 150.

Figure 2:
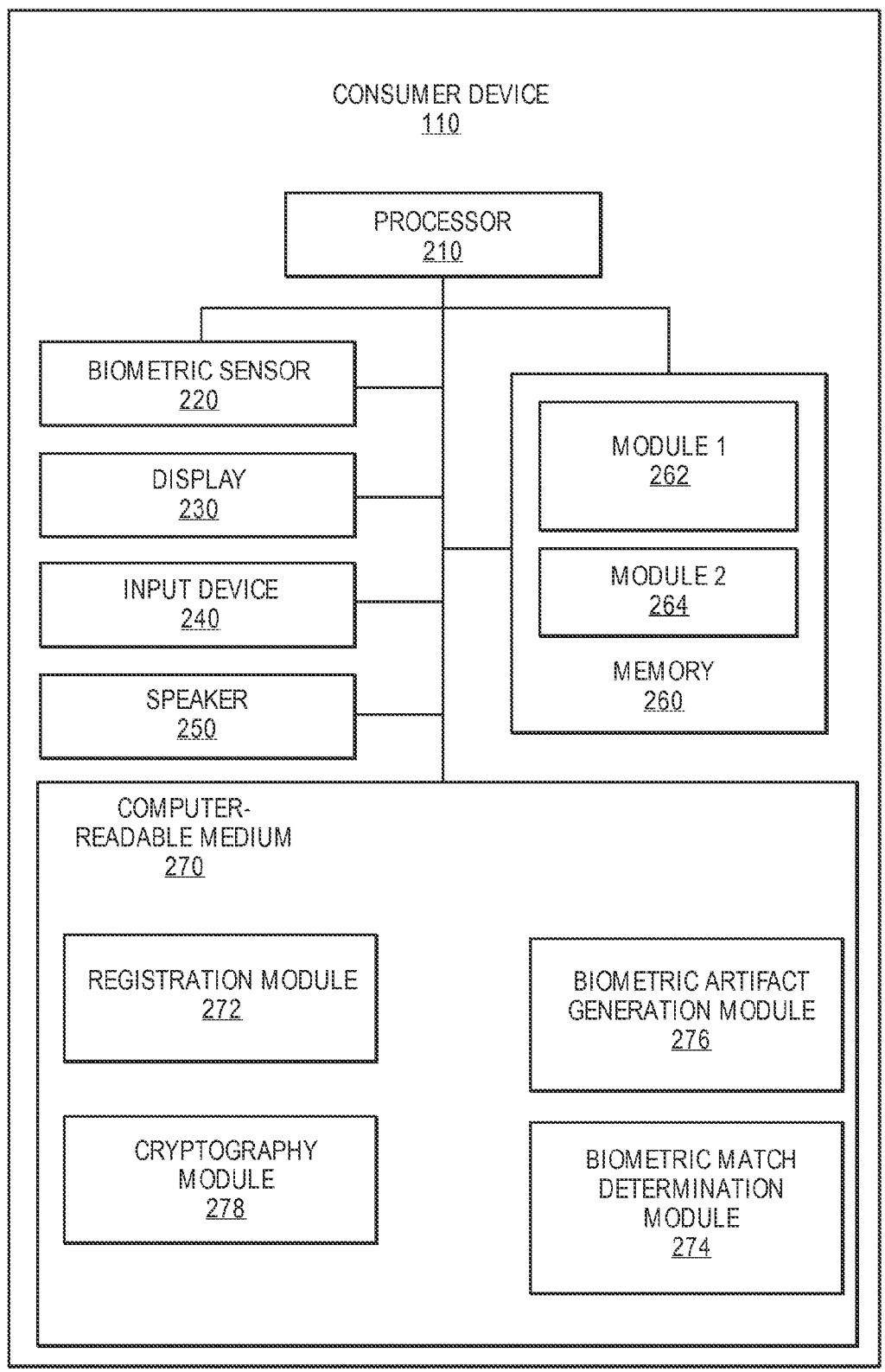
FIG. 2 is a block diagram of a mobile device, according to an embodiment of the present invention.

FIG. 2 is a block diagram of a consumer device 110, according to an embodiment of the present invention. Consumer device 110 includes a processor 210, a biometric sensor 220, a display 230, an input device 240, a speaker 250, a memory 260, and a computer-readable medium 270.

Processor 210 may be any general-purpose processor operable to carry out instructions on the consumer device 110. The processor 210 is coupled to other units of the consumer device 110 including biometric sensor 220, display 230, input device 240, speaker 250, memory 260, and computer-readable medium 270.

Biometric sensor 220 is a sensor within consumer device 110 operable for detecting a user biometric. In one example, the biometric sensor 220 may be a fingerprint scanner on the consumer device 110 operable to scan a user's fingerprint and store its corresponding biometric data within memory 260. In another example, the biometric sensor 220 may be a microphone operable to record a user's voice sample and store its corresponding biometric data within the memory 260. In yet another example, the biometric sensor 220 may be a retinal scanning device operable to scan a user's retina and store its corresponding biometric data within the memory 260. The biometric data may be stored within the computer-readable medium 270 via processor 210.

Display 230 may be any device that displays information to a user. Examples may include an LCD screen, CRT monitor, or seven-segment display.

Input device 240 may be any device that accepts input from a user. Examples may include a keyboard, keypad, or mouse. In some embodiments, biometric sensor 220 may be considered an input device 240.

Speaker 250 may be any device that outputs sound to a user. Examples may include a built-in speaker or any other device that produces sound in response to an electrical audio signal. In some embodiments, speaker 250 may be used to request the user for a biometric input or to provide feedback on the progress of biometric detection.

Memory 260 may be any magnetic, electronic, or optical memory. Memory 260 includes two memory modules, module 1 262 and module 2 264. It can be appreciated that memory 260 may include any number of memory modules. An example of memory 260 may be dynamic random access memory (DRAM).

Computer-readable medium 270 may be any magnetic, electronic, optical, or other computer-readable storage medium. Computer-readable storage medium 270 includes registration module 272, cryptography module 278, biometric artifact generation module 276, and biometric match determination module 274. Computer-readable storage medium 270 may comprise any combination of volatile and/or non-volatile memory such as, for example, buffer memory, RAM, DRAM, ROM, flash, or any other suitable memory device, alone or in combination with other data storage devices.

Registration module 272 is configured to register a user with the consumer device 110. In some embodiments, a user may register his/her biometric data with the consumer device 110. The registration may be performed via biometric sensor 220. The registered user biometric data may be stored within memory 260. For example, consumer device 110 may request a user to register his/her biometric data by displaying a prompt, on display 230, to scan his/her index finger on biometric sensor 220 for purposes of registration. Upon scanning the user's finger on biometric sensor 220, the registered biometric data corresponding to the scanned fingerprint may be stored within memory 260 for future biometric authentication of the user.

Biometric match determination module 274 is configured to determine whether an inputted biometric data from a user matches a previously registered, by the registration module 272, biometric data from the user. For example, if a user wishes to initiate a payment transaction, display 230 may request the user to provide his/her biometric data by displaying a prompt, on display 230, to scan his/her index finger on the biometric sensor 220. The scanned index finger and corresponding biometric data may be used for purposes of authenticating the user prior to initiating the payment transaction. The biometric match determination module 274 may then compare the biometric data corresponding to the scanned index finger to previously registered biometric data of the user that is stored within memory 260. If a match is determined a biometric artifact may be generated, discussed below.

Biometric artifact generation module 276 is configured to generate a biometric digital artifact based on a determination of the match by the biometric match determination module 274. The biometric digital artifact may include information regarding the type of biometric data received by the biometric sensor 220 (e.g. voice biometric, fingerprint biometric, DNA biometric, etc.) and whether a match was determined by the biometric match determination module 274. Each time user biometric authentication is performed, the biometric digital artifact generated by the biometric artifact generation module 276 is unique to the user and the particular authentication instance. It is highly unlikely that two generated biometric digital artifacts will be identical.

Cryptography module 278 is configured to generate a cryptographic value of the biometric digital artifact. The cryptographically generated biometric digital artifact may then be sent by the consumer device 110 to a server computer for verification against an expected biometric digital artifact (described below).

Figure 3:
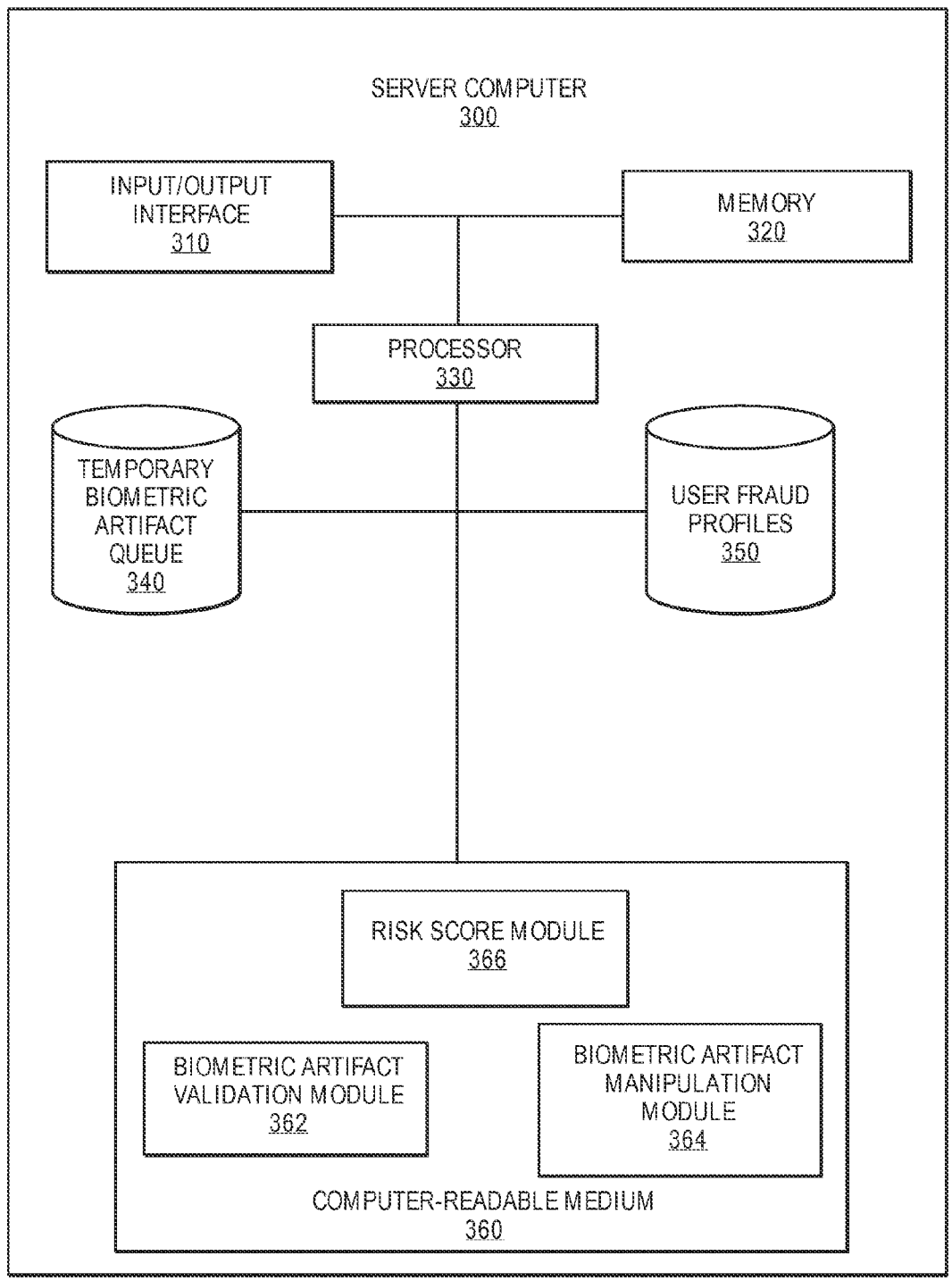
FIG. 3 is a block diagram of a server computer, according to an embodiment of the present invention.

FIG. 3 is a block diagram of a server computer 300, according to an embodiment of the present invention. Server computer 300 includes an input/output interface 310, a memory 320, a processor 330, a temporary biometric artifact queue 340, a user fraud profile database 350, and a computer-readable medium 360. In some embodiments, the server computer may reside within the interconnected network 160.

The input/output (I/O) interface 310 is configured to receive and transmit data. For example, the I/O interface 310 may receive the biometric digital artifact from the consumer device 110 (FIG. 1). Upon processing and verifying the authenticity of the biometric digital artifact, the I/O interface 310 may indicate to the terminal 120 (FIG. 1) and/or consumer device 110 (FIG. 1) that a payment transaction may proceed. The I/O interface 310 may also be used for direct interaction with the server computer. The I/O interface 310 may accept input from an input device such as, but not limited to, a keyboard, keypad, or mouse. Further, the I/O interface may display output on a display device.

Memory 320 may be any magnetic, electronic, or optical memory. It can be appreciated that memory 320 may include any number of memory modules. An example of memory 320 may be dynamic random access memory (DRAM).

Processor 330 may be any general-purpose processor operable to carry out instructions on the server computer 300. The processor 330 is coupled to other units of the server computer 300 including input/output interface 310, memory 320, temporary biometric artifact queue 340, user fraud profile database 350, and computer-readable medium 360.

Temporary biometric artifact queue 340 is configured to temporarily store the biometric digital artifacts generated by the biometric artifact generation module 276 (FIG. 2). In some embodiments, the temporary biometric artifact queue 340 is a queue with a database on server computer 300. The temporary biometric artifact queue 340 temporarily stores the biometric digital artifact for a predetermined period of time prior to storing the biometric digital artifact in the user fraud profile database 350. In some embodiments, predetermined period of time is a time period during which no fraud is reported to the issuer 150 (FIG. 1). If no fraud is reported to the user 150 (FIG. 1) during the predetermined period of time, there may be reasonable certainty that the biometric digital artifact was generated based on user biometric data of the actual payment user and the biometric digital artifact may be stored in the user fraud profile database 350 for purposes of building the user fraud profile (discussed below).

The user fraud profile database 350 is configured to store a fraud profile of a payment user. The fraud profile of a payment cardholder may include attributes such as, but not limited to, initiation date of the payment transaction, initiation time of the payment transaction, the payment cardholder's name, the biometric digital artifact associated with the payment transaction, the outcome of payment cardholder verification/authentication, and a variable risk score for the user. These attributes of the payment user's fraud profile are described in detail in FIG. 7.

Computer-readable medium 360 may be any magnetic, electronic, optical, or other computer-readable storage medium. Computer-readable storage medium 360 includes biometric artifact validation module 362, biometric artifact manipulation module 364, risk score module 366, and payment processing module 368. Computer-readable storage medium 360 may comprise any combination of volatile and/or non-volatile memory such as, for example, buffer memory, RAM, DRAM, ROM, flash, or any other suitable memory device, alone or in combination with other data storage devices.

Biometric artifact validation module 362 is configured to determine whether the biometric digital artifact generated by the biometric artifact generation module 276 (FIG. 2) of consumer device 110 (FIG. 2) is valid. To determine whether the received biometric digital artifact is valid, the biometric artifact validation module 362 may compare the received biometric digital artifact against a previously stored valid biometric digital artifact for the particular payment user in the user fraud profile database 350. In some embodiments, a feature extractor creates a template of the biometric digital artifact and the template is used for comparison against received biometric digital artifacts. The received biometric digital artifact need not be, and likely won't be, an exact match to the previously stored valid biometric digital artifact to be considered valid. It is expected that each biometric digital artifact for a particular payment user generated for each payment transaction will be different because of variances in the received user biometric data. For example, a user may not scan their fingerprint biometric data in the exact same location on the biometric sensor 220 (FIG. 2) each and every time. In another example, a user's biometric voice sample may not be spoken in the same tone each and every time. In some embodiments, if the payment user is initiating a payment transaction for the first time, there may not be a previously stored valid biometric digital artifact and as such, the first received biometric digital artifact may be considered valid and used for purposes of comparison for future received biometric digital artifacts.

Biometric artifact manipulation module 364 is configured to temporarily store the generated biometric digital artifact in the temporary biometric artifact queue 340. As described above, the temporary biometric artifact queue 340 temporarily stores the biometric digital artifact for a predetermined period of time prior to storing the biometric digital artifact in the user fraud profile database 350. Upon expiration of the predetermined period of time, the biometric artifact manipulation module 364 may forward the biometric digital artifact from the temporary biometric artifact queue 340 to the user fraud profile database 350 for purposes of building the user fraud profile.

Risk score module 366 is configured to calculate and adjust a risk score associated with the payment user for each requested payment transaction. The risk score may be based on a number of valid biometric digital artifacts received without fraudulent activity. Upon each subsequently received valid biometric digital artifact, the risk score module 366 may adjust the risk score associated with the user that is stored within the user fraud profile database 350. For example, a relatively new payment user who may not have many registered valid digital biometric artifacts stored in the user fraud profile database 350 may have a higher risk score than a payment user who has a significantly higher number of valid digital biometric artifacts stored in the user fraud profile database 350. Each payment user's risk score may be adjusted lower upon each subsequent valid digital biometric artifact received.

Risk scores may also be generated using other criteria, such as the type of transaction being conducted (e.g., card present or card not present), the location of the transaction (e.g., close to the billing address or far from the billing address), the amount of the transaction (e.g., high transaction amount vs. low transaction amount), etc.

Figure 4:
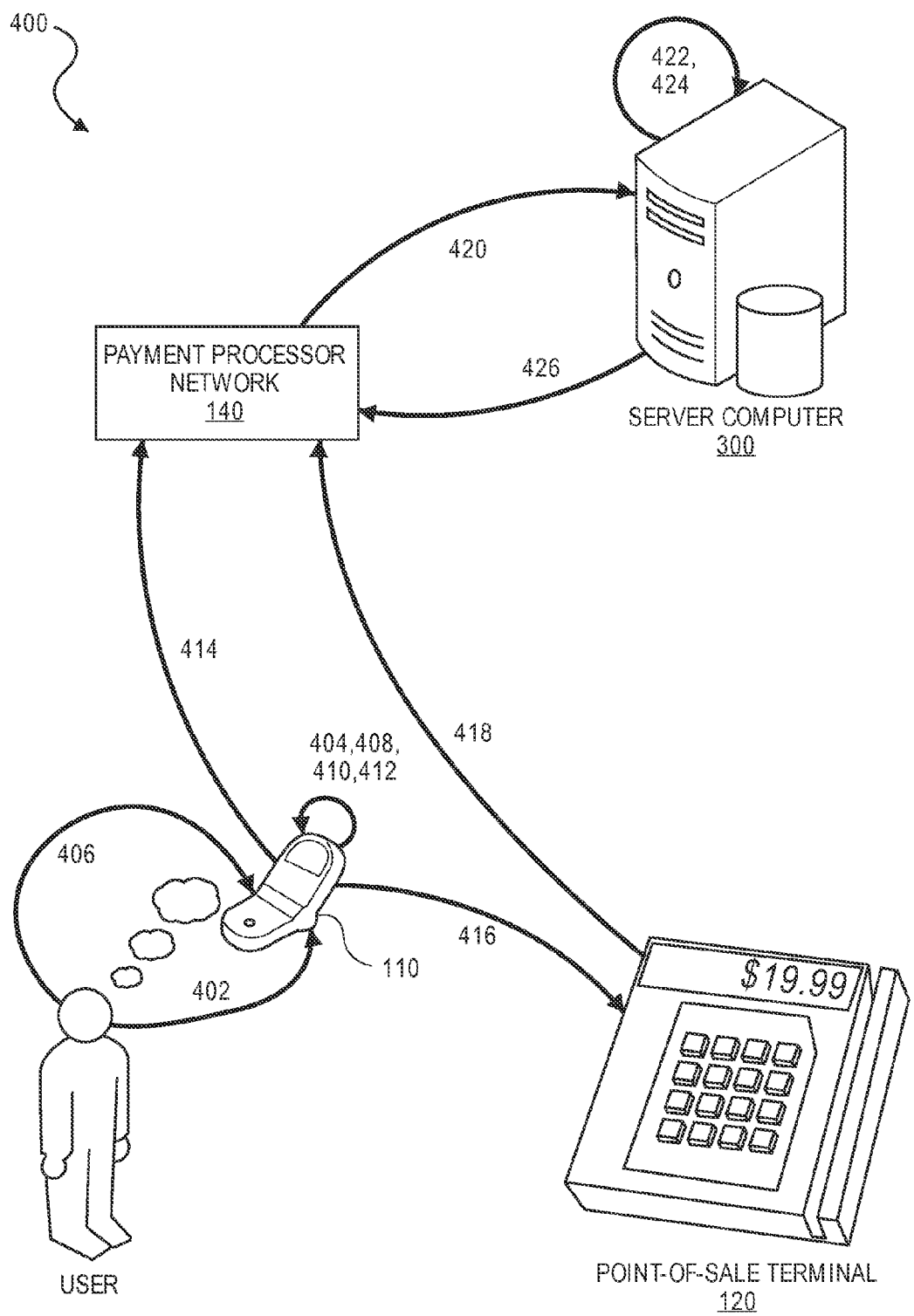
FIG. 4 is a flow diagram illustrating a method for authenticating a user for a transaction, according to an embodiment of the present invention.

FIG. 4 is a flow diagram illustrating a method 400 for authenticating a user, according to an embodiment of the present invention. The method 400 can be performed by processing logic that may comprise hardware (circuitry, dedicated logic, etc.), software (such as is run on a general purpose computing system or a dedicated machine), firmware (embedded software), multiple systems or any combination thereof.

In certain embodiments, the user locally registers their biometric on the consumer device 110 using software that provides this service (e.g., a smart phone application). Biometric data can include fingerprint data, retinal scan data, digital photographic data (e.g., facial recognition data), deoxyribonucleic acid (DNA) data, palm print data, hand geometry data, iris recognition data, and voice recognition data.

At step 402, the user registers a voice biometric on the consumer device 110 by, for example, initially repeating a certain pass phrase (e.g., voice recognition biometric) into the phone to establish a first reference biometric (e.g., first biometric data). The consumer device 110 can utilize the first biometric data as a reference to compare subsequent biometric input data. The user's voice may be captured by the biometric sensor 220 (FIG. 2). In some embodiments, the consumer device 110 may capture biometric data in the form of the user's fingerprint.

At step 404, the consumer device 110 stores the biometric data captured from the user. In some embodiments, the biometric data may be stored within memory 260 (FIG. 2) on the consumer device 110.

At step 406, the consumer device 110 (e.g., smart phone) captures biometric data (e.g., second biometric data) from a user as he/she speaks into it. The user's voice may be captured by the biometric sensor 220 (FIG. 2). In some embodiments, the consumer device 110 may capture biometric data from the user's fingerprint. The second biometric data is captured by from the user when the user wishes to initiate a payment transaction.

At steps 408 and 410, the consumer device 110 locally compares the first and second set of biometric data and determines whether the biometric information matches according to a predetermined threshold (e.g., predetermined criteria, correlation, etc.). The predetermined threshold may identify or quantify how much the received input data (e.g., second set of biometric data) and the previously stored input data (e.g., first set of biometric data) should match. If the received input data and the previously stored input data match according to the predetermined threshold, then the data is considered a match. Alternatively, the correlation can determine a "risk factor" associated with the input data. A high correlation can constitute a low risk factor and a low correlation can constitute a high risk factor. Setting the appropriate threshold to ensure an acceptable level of accuracy would be appreciated by one of ordinary skill in the art. One example of a predetermined threshold can be a requirement for a particular number of matching features between two biometric inputs. In the example depicted in FIG. 4, the correlation between the first and second sets of biometric data can include comparing various electrical properties or characteristics of the voice recordings.

At step 412, the consumer device 110 creates a unique biometric digital artifact based on the comparison between the first and second biometric data. The biometric digital artifact provides unforgeable evidence of the match between the first and second biometric data. In certain embodiments, the biometric digital artifact indicates the type of biometric used (e.g., finger print, voice scan, etc.) and whether there was a match or correlation between the two data sets.

At step 414, the consumer device 110 sends the payment card data (or alternatively payment account data) and biometric digital artifact to the payment processor network 140. In certain embodiments, steps 412 and 414 are parallel transactions and can occur substantially simultaneously with respect to each other. Alternatively, step 412 may occur before or after step 414. In further embodiments, the consumer device 110 can send the biometric digital artifact, consumer device verification method (CDVM), and authorization request to the terminal 120 (FIG. 1) instead of directly sending the biometric digital artifact to the payment processing network. In other words, certain embodiments can combine steps 412 and 414 through the path of the terminal 120 (FIG. 1), acquirer 130 (FIG. 1), and payment processing network 140 (FIG. 1). It should be noted that the biometric digital artifact can be referred to as a unique digital artifact.

At step 416, a connection is created from the consumer device 110 to the terminal 120 (e.g., via contactless reader) using a CDVM indicating that the first and second biometric of the user matched according to the predetermined threshold (i.e., the user is authenticated). In certain embodiments, step 416 may be performed any time after step 404, e.g. after the user registers and stores their biometric data on the consumer device. For example, when the user wishes to initiate a payment transaction to pay for groceries at a supermarket checkout line, a connection will be made between the consumer device 110 and the terminal 120 to facilitate the transaction.

At step 418, the merchant (terminal 120) sends transaction data to the payment processor network 140. The transaction data can include an indication of the CDVM and the authorization request message to request authorization to conduct an electronic payment transaction. The transaction data can further include an issuer account identifier. The issuer account identifier may be a payment card account identifier associated with a payment card. The authorization request message may request that an issuer of the payment card authorize a transaction. An authorization request message according to an embodiment of the invention may comply with ISO 8583, which is a standard for systems that exchange electronic transactions made by users using payment cards. Similar to step 416 described above, step 418 can occur after, or substantially simultaneously as step 404.

At step 420, the server computer 300 receives the biometric digital artifact from the payment processor network 140. In step 422 the biometric digital artifact is verified and validated against previously recorded valid biometric digital artifacts in a template, as described above. The previously recorded valid digital artifacts may be stored in the user fraud profile database 350 (FIG. 3) on server computer 300. In certain embodiments, the biometric digital artifact provides the type of biometric analyzed by the consumer device 110 and an indication of the correlation between the user's biometric sample (second biometric data) and the reference biometric sample (first biometric data).

At step 424, a risk score associated with the payment transaction is adjusted. As described above, the risk score may be based on a number of valid biometric digital artifacts received without fraudulent activity. Upon each subsequently received valid biometric digital artifact, the risk score module 366 (FIG. 3) may adjust the risk score associated with the payment user that is stored within the user fraud profile database 350 (FIG. 3) on server computer 300.

At step 426, the result of the determination as to whether a valid biometric digital artifact was received is sent to the payment processor network 140 (or a server computer therein). The payment processor network 140 records the fact that the verification (i.e., authentication) has occurred. Subsequent transactions repeat this process (steps 406-418) and over time the biometric authentication process becomes increasingly trustworthy (e.g., low risk) provided that no fraudulent activity is associated with the biometric authentication process.

In some embodiments of the invention, the server computer in the payment processing network 140 may not record the fact that verification has occurred until a predetermined period of time has elapsed (e.g., more than 1, 3, 5 days, or more than 1 month). It may hold the digital artifact in a queue (descried above) until the predetermined amount of time has elapsed. That is, the biometric digital artifact is not deemed valid by the server computer and is not used to create a model for future authentication, until a period of time has elapsed. By doing so, it may be ensured that only digital artifacts from the genuine user are used to create or add to a fraud model of the genuine user. If the authorized user has not reported that the transaction is fraudulent after the period of time, then the transaction and the artifact are considered valid and the artifact and biometric sample can be used to update a model and/or user profile for the user for future transactions.

Figure 5A:
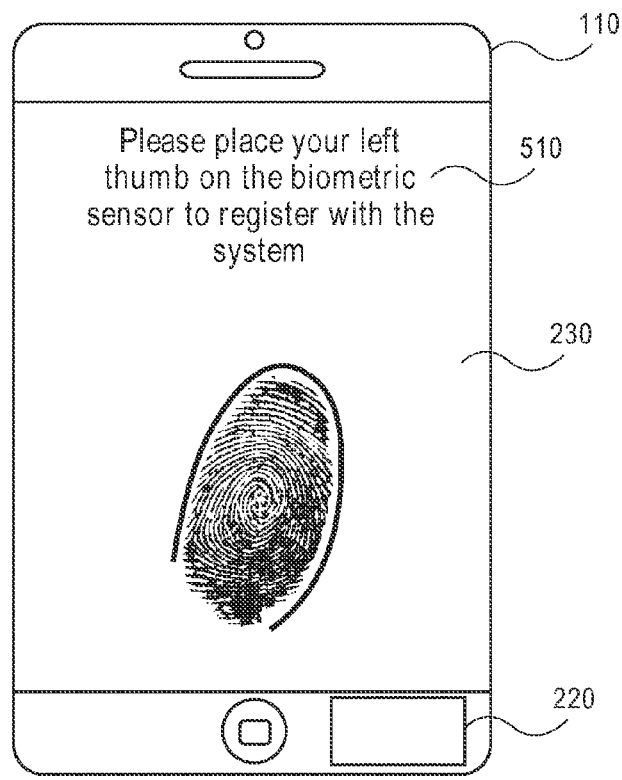
FIG. 5A illustrates registering a user biometric via a thumbprint, according to an embodiment of the present invention.

FIG. 5A illustrates registering a user biometric via a thumbprint, according to an embodiment of the present invention. As described above, consumer device 110 includes a display 230 and a biometric sensor 220. The biometric sensor 220 is configured to receive biometric data from the user. In this example, the biometric sensor 220 is configured to receive a fingerprint from a user.

FIG. 5A illustrates an example of when a user wishes to register their biometric data (first biometric data) for use with the consumer device 110. The consumer device 110 may request the biometric data by displaying a prompt for registration 510 on the display 230 indicating to the user to place their finger on the biometric sensor 220. In this example, the prompt for registration 510 requests the user to place their left thumb on the biometric sensor 220 to register with the system. The display 230 may also display an image of a left thumbprint for purposes of aiding the user in placing the correct finger on the biometric sensor 220.

Upon the user placing their fingerprint on the biometric sensor 220 and registering their biometric data with the consumer device 110, the user and consumer device 110 are ready for subsequent payment transactions and their associated biometric authentication, as described above. FIG. 5A illustrates steps 402 and 404 of FIG. 4.

Figure 5B:
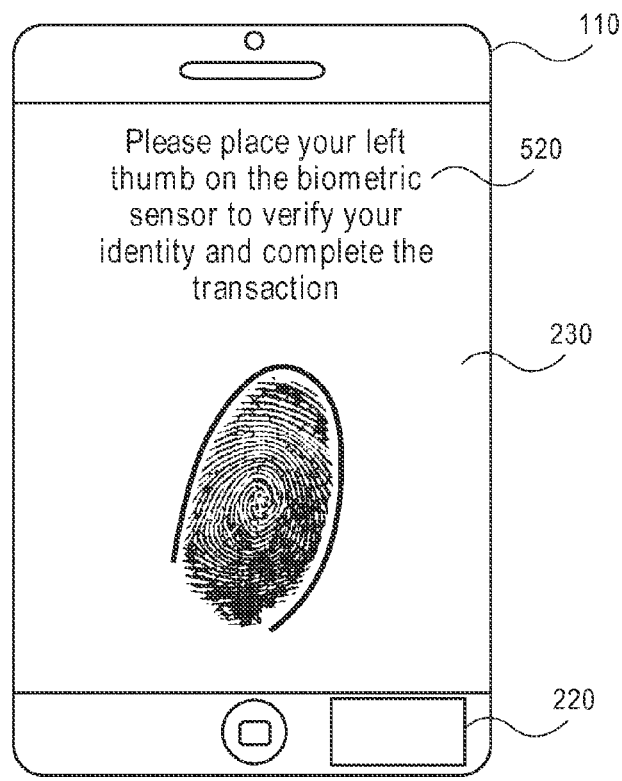
FIG. 5B illustrates authenticating a user via a thumbprint, according to an embodiment of the present invention.

FIG. 5B illustrates authenticating a user via a thumbprint, according to an embodiment of the present invention. As described above, consumer device 110 includes a display 230 and a biometric sensor 220. The biometric sensor 220 is configured to receive biometric data from the user. In this example, the biometric sensor 220 is configured to receive a fingerprint from a user.

FIG. 5B illustrates an example of when a user wishes to authenticate with the consumer device 110 using their biometric data (second biometric data). The consumer device 110 may request the biometric data by displaying a prompt for authentication 520 on the display 230 indicating to the user to place their finger on the biometric sensor 220. In this example, the prompt for registration 510 requests the user to place their left thumb on the biometric sensor 220 to register with the system. The display 230 may also display an image of a left thumbprint for purposes of aiding the user in placing the correct finger on the biometric sensor 220.

Upon the user placing their fingerprint on the biometric sensor 220 and authenticating their biometric data with the consumer device 110, the consumer device 110 may compare the first and second set of biometric data to determine whether the two match. The consumer device 110 may then create a biometric digital artifact based on the second biometric and send payment card data and the biometric digital artifact to the payment processor network 140 (FIG. 1). FIG. 5B illustrates steps 406 through 414 of FIG. 4.

Figure 6A:
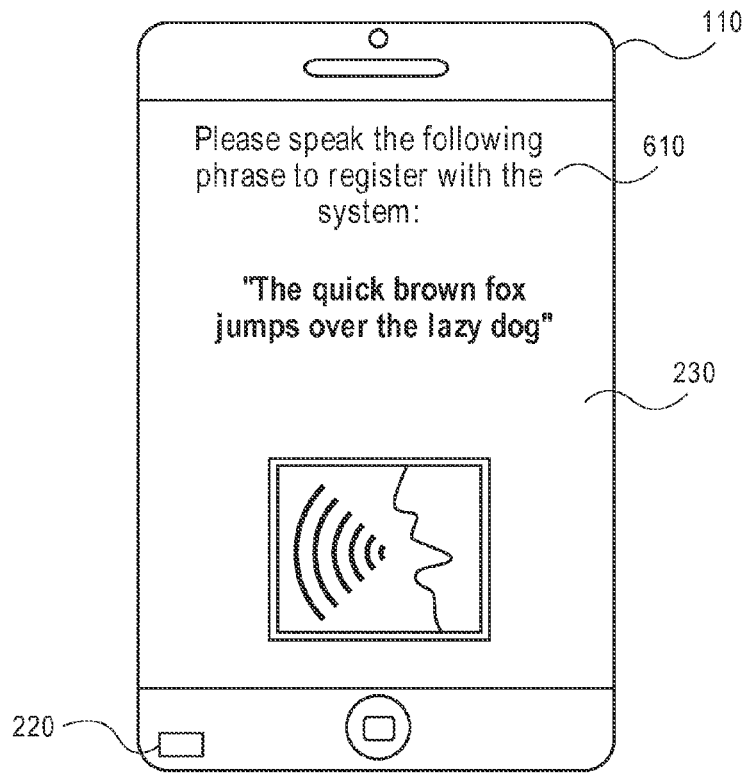
FIG. 6A illustrates registering a user biometric via a voice sample, according to an embodiment of the present invention.

FIG. 6A illustrates registering a user biometric via a voice sample, according to an embodiment of the present invention. FIG. 6A is similar to FIG. 5A except that the biometric registration process uses a user voice sample instead of a user thumbprint. Similar to FIG. 5A, the display 230 displays a prompt for registration 610 indicating to the user to speak a predefined phrase to the biometric sensor 220. In this example, the biometric sensor 220 is a microphone input device configured to receive a voice sample. In this example, the prompt for registration 610 requests the user to speak the phrase "The quick brown fox jumps over the lazy dog" in order to register the user biometric with the consumer device 110.

Figure 6B:
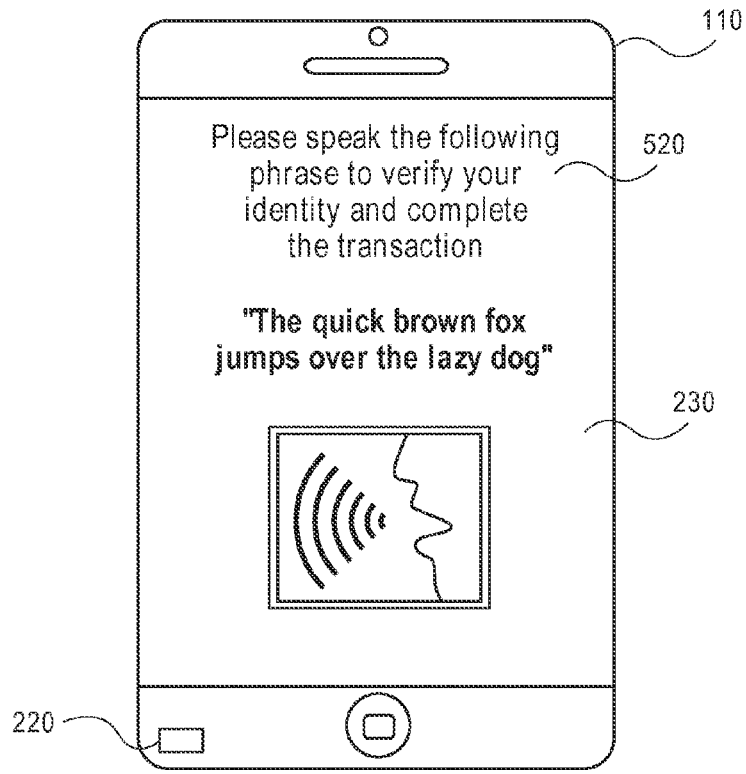
FIG. 6B illustrates authenticating a user via a voice sample, according to an embodiment of the present invention.

FIG. 6B illustrates authenticating a user via a voice sample, according to an embodiment of the present invention. FIG. 6B is similar to FIG. 5B except that the biometric registration process uses a user voice sample instead of a user thumbprint. Similar to FIG. 5B, the display 230 displays a prompt for authentication 620 indicating to the user to speak a predefined phrase to the biometric sensor 220. In this example, the biometric sensor 220 is a microphone input device configured to receive a voice sample. In this example, the prompt for authentication 620 requests the user to speak the phrase "The quick brown fox jumps over the lazy dog" in order to register the user biometric with the consumer device 110. It can be appreciated that the phrases requests for registration and authentication may be different.

Figure 7:
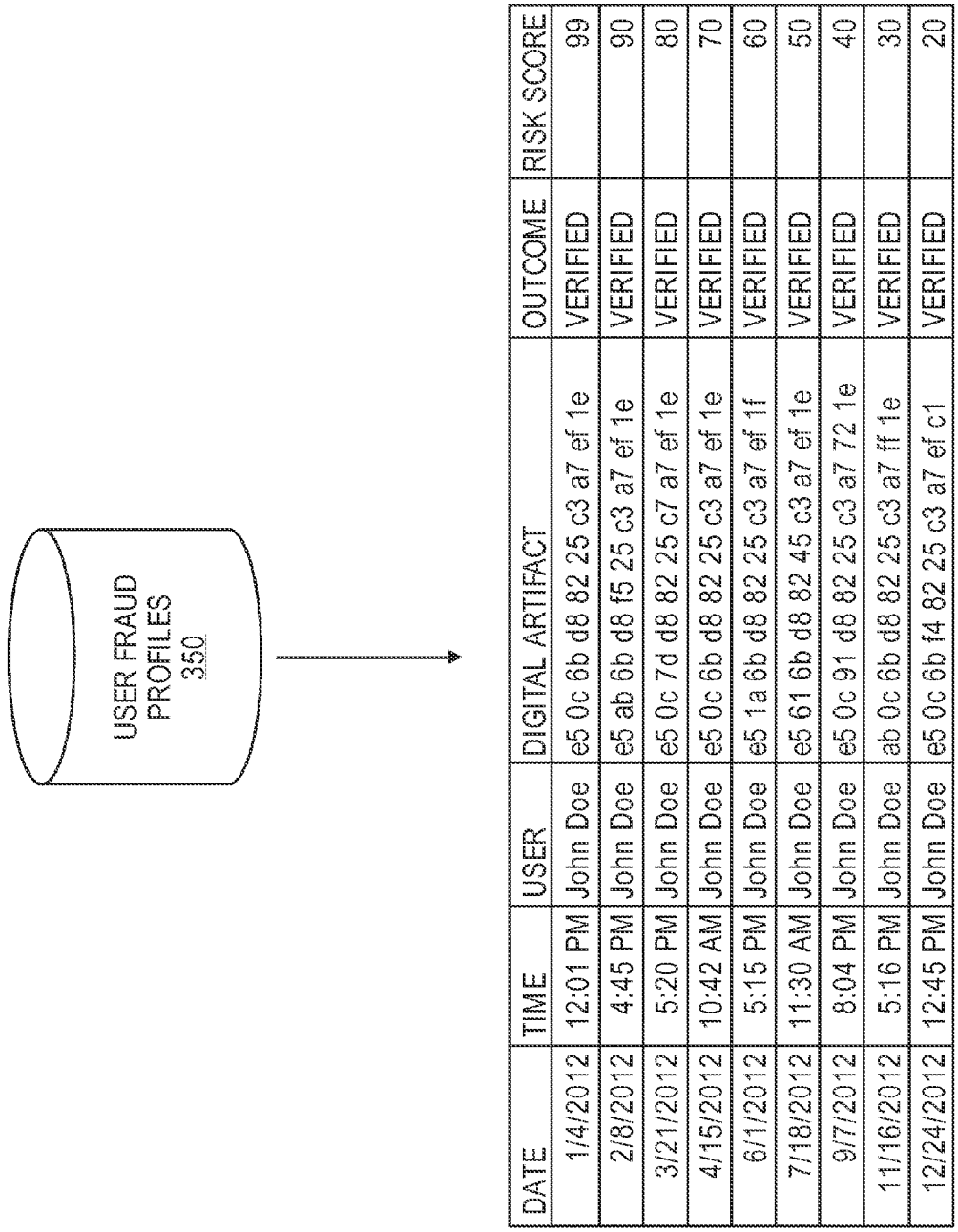
FIG. 7 illustrates a user fraud profile stored within a database, according to an embodiment of the present invention.

FIG. 7 illustrates a user fraud profile 350 stored within a database, according to an embodiment of the present invention. In some embodiments, the user fraud profile 350 may be stored within a database on server computer 300 (FIG. 3). The user fraud profile 350 is configured to store a fraud profile of a payment user. The fraud profile of a payment user may include attributes such as, but not limited to, initiation date of the payment transaction, initiation time of the payment transaction, the payment user's name, the biometric digital artifact associated with the payment transaction, the outcome of payment user verification/authentication, and a variable risk score for the user.

FIG. 7 shows nine different payment authorization requests for a user named "John Doe." Each of the nine payment authorization requests includes the attribute information mentioned above.

The date attribute of the user fraud profile 350 indicates the date at which a user initiated a payment transaction with the consumer device 110 (FIG. 1). In this example, the first recorded date (Jan. 4, 2012) indicates the first payment transaction initiated by the user after registering with the consumer device 110. Each subsequent date represents a subsequent payment transaction initiated by the user.

The time attribute of the user fraud profile 350 indicates the time of day on the date at which the user initiated the particular payment transaction.

The user attribute of the user fraud profile 350 indicates the registered name for the genuine user. In this example, the registered name, "John Doe" is the same for every payment authorization request. It can be appreciated that the user fraud profile database 350 stores the recorded payment authorization requests for each user in a unique location within the database. Other locations within the database, not shown in this example, may contain fraud profiles for other users having a different name.

The digital artifact attribute of the user fraud profile 350 indicates the particular biometric digital artifact that was generated by the consumer device 110 (FIG. 1) upon biometric authentication of the user and sent to the server computer 300 (FIG. 3). As mentioned above, the biometric digital artifact for each individual payment transaction request initiated by the user is unique. The biometric digital artifact includes information regarding the type of biometric data received (e.g. voice sample, fingerprint, etc.) and the result of the determination by the consumer device 110 (FIG. 1) as to whether the received biometric data (second biometric data) matches the registered biometric data (first biometric data) from the user.

FIG. 7 shows nine different cryptographically generated biometric digital artifacts for each of the nine payment transactions initiated by the user. As shown, each of the biometric digital artifacts is unique. However, it can be seen that each biometric digital artifact only differs from another slightly with a change in just a few bits of the cryptographically generated values. Since it is highly unlikely that each received biometric data from the user will be identical every time, the biometric digital artifacts are unique for each transaction. For example, it is highly unlikely that a user will place their finger in the same exact location on the biometric sensor 220 (FIG. 2) every time or that a user speaks in the same tone for the voice biometric every time.

The first biometric digital artifact (stored on Jan. 4, 2012) is the generated value upon a user performing their first payment authorization request after registering with the consumer device 110 (FIG. 1). The second stored biometric digital artifact is the generated value on a subsequent payment authorization request. This second stored biometric digital artifact is compared against the first stored biometric digital artifact using the created template, described above. As long as the difference in the cryptographic values of the two biometric digital artifacts is below a predefined threshold (e.g. a few bits), the second biometric digital artifact will be considered to be valid. If a received biometric digital artifact is significantly different than previously received and stored biometric digital artifacts in the user fraud profile database 350, the received biometric digital artifact may not be verified and the payment transaction request may be denied for possible fear of a fraudster wishing to initiate the payment transaction request.

As more biometric digital artifacts are received and stored, more comparison points for subsequently received biometric digital artifacts are available. For example, the ninth received biometric digital artifact (Dec. 24, 2012) may be compared against the previous eight stored biometric digital artifacts in order to determine its validity. In some embodiments, a number of received biometric digital artifacts may be used to create a biometric model of the user. For example, six of the received biometric digital artifacts may be used to create a biometric model of the user. Any subsequent received biometric digital artifact may be compared against the biometric model of the user.

The outcome attribute of the user fraud profile 350 indicates the outcome of the validation of the received biometric digital artifact. If the comparison of the received biometric digital artifact to previously stored and verified biometric digital artifacts in the template results in a valid comparison, the received biometric digital artifact will be considered verified and will be stored in the user fraud profile 350 for use in subsequent validations.

The risk score attribute of the user fraud profile 350 indicates a risk score associated with the particular payment transaction request. In this example, the risks score may be on a scale from 0-100, with 100 being the highest (most risk). The risk score is adjustable for each payment transaction request. As described above, the risk score module 366 (FIG. 3) is configured to adjust the risk score. As more and more biometric digital artifacts are received and verified by the server computer 300 (FIG. 3), the risk score associated with the user decreases and the user may be considered to be more trustworthy.

As demonstrated in FIG. 7, the risk score is decreasing for each subsequent payment transaction request initiated by user "John Doe." The first received biometric digital artifact has the highest risk score of 99. Each subsequent received and validated biometric digital artifact results in an adjusted lowered risk score. The adjusting of the risk score may be determined based on a predetermined formula. The current risk score for user "John Doe" is 20, indicating that the user has performed a number of valid authentications with the consumer device 110 (FIG. 1) and the user is considered to be trustworthy (low risk).

II. Exemplary Methods

Figure 8:
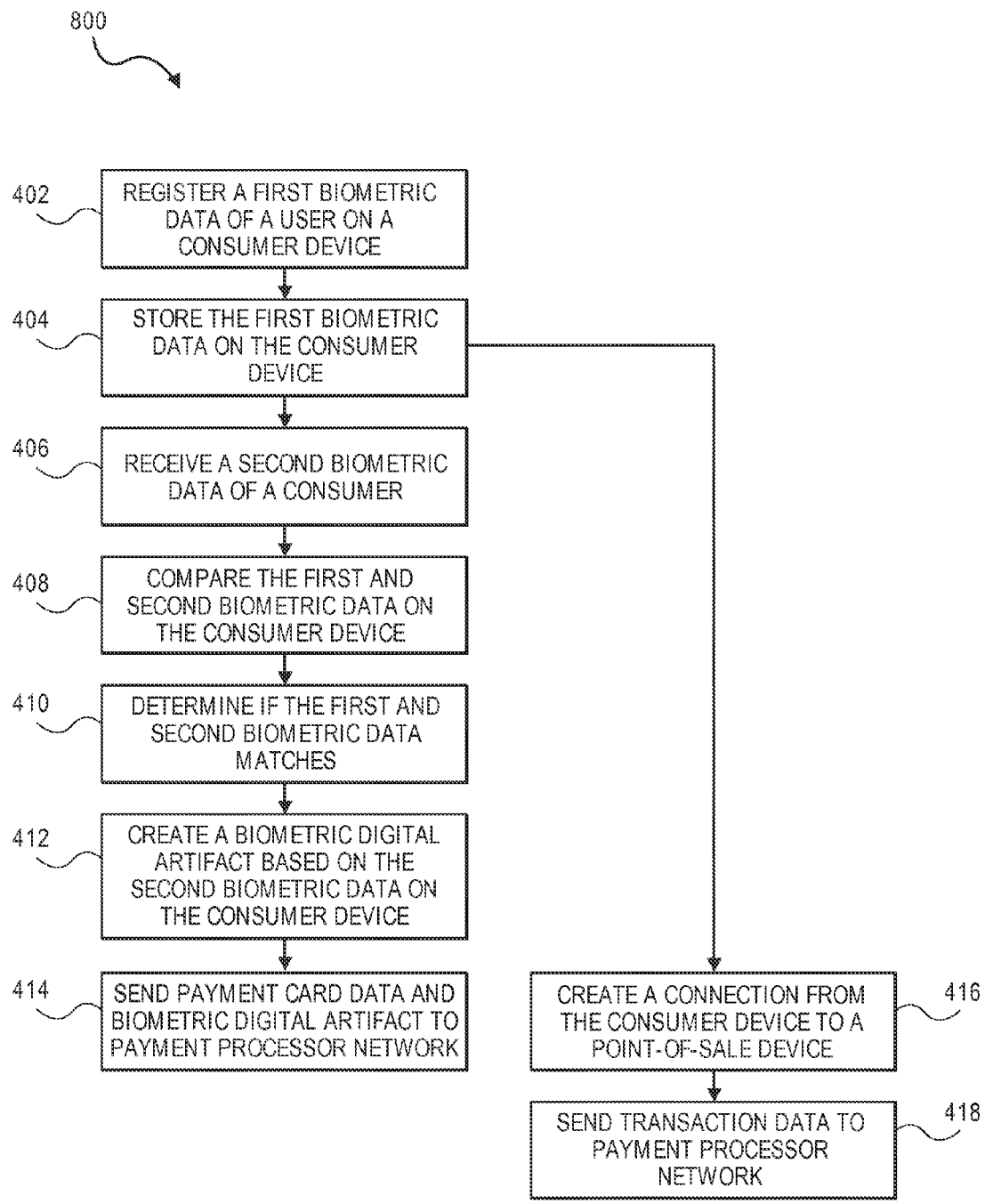
FIG. 8 is a flow diagram illustrating a method for authenticating a user for a transaction at a consumer device, according to an embodiment of the present invention.

FIG. 8 is a flow diagram illustrating a method 800 for authenticating a user for a transaction at a consumer device, according to an embodiment of the present invention. The method 800 is performed by processing logic that may comprise hardware (circuitry, dedicated logic, etc.), software (such as is run on a general purpose computing system or a dedicated machine), firmware (embedded software), or any combination thereof. In certain embodiments, the method 800 is performed by the consumer device 110 of FIG. 1. The steps of method 800 correspond to the steps in the flow diagram of FIG. 4.

Referring to FIG. 8, the method 800 begins with registering a first biometric data for a user (step 402). The user registers a first set of biometric data (e.g., finger print, voice print, iris scan, etc.) on the consumer device, which functions as reference data to compare subsequent biometric scans. At 404, the consumer device stores the first set of biometric data in memory. At 406, a user enters a biometric input (e.g., second biometric data) into the consumer device. As described above, the user enters the biometric data to begin the authentication process and initiate a financial transaction. The biometric data may be received by the biometric sensor on the consumer device. At step 408, the consumer device compares the first and second biometric data to determine if they match according to a predetermined criteria. For example, the consumer device can compare a user's fingerprint to a fingerprint stored during the registration process (step 402) and determine if the finger prints are sufficiently similar (e.g., finger prints have matching identifiable features, patterns, ridges, etc.) to reasonably conclude that the person conducting the transaction is who they claim to be. The consumer device determines if the first and second user biometric data matches (step 410), as described above, and creates a biometric digital artifact based on the second biometric data (step 412). In some embodiments, the biometric digital artifact can be based on both the first and second biometric data. The biometric digital artifact may then be sent to the payment processor network (step 414). The biometric digital artifact provides the payment processing network with proof that the biometric authentication process occurred and that it correlated according to a predetermined criteria.

In step 416, a connection is created between the consumer device and a (POS) terminal. This connection may be created after the user has registered their biometric data (first biometric) with the consumer device. In step 418, the (POS) terminal sends the transaction data to the payment processor network for payment processing. The transaction data includes information pertinent to the particular transaction the user wishes to initiate the payment request authorization for.

It should be appreciated that the specific steps illustrated in FIG. 8 provides a particular method for authenticating a user for a transaction at a consumer device, according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 800.

Figure 9:
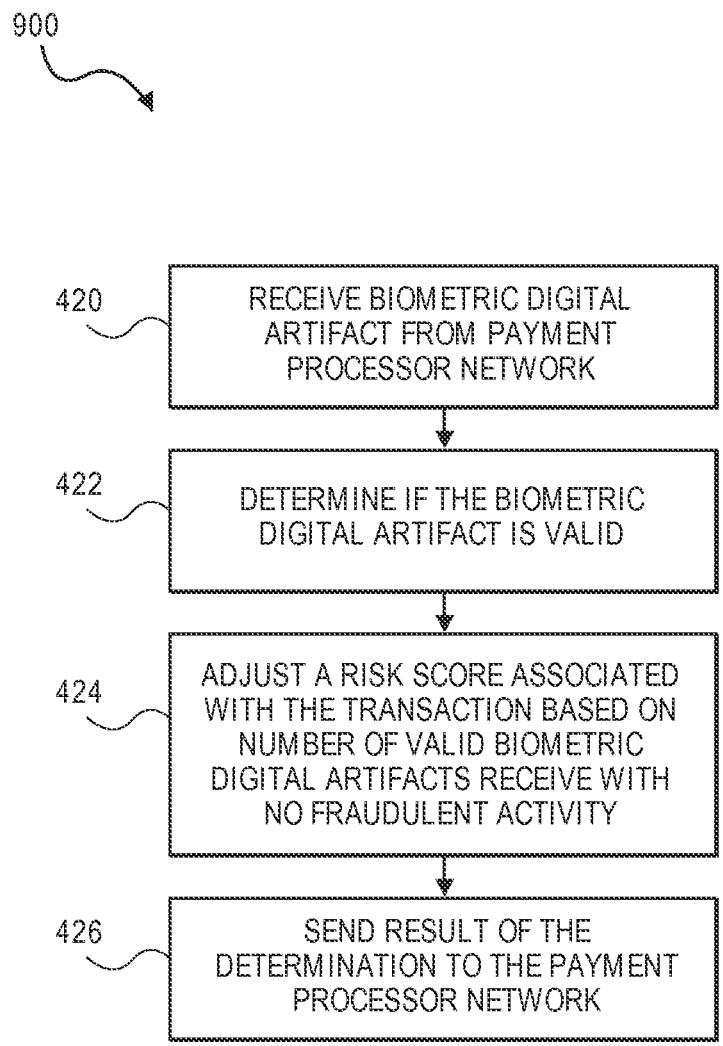
FIG. 9 is a flow diagram illustrating a method for authenticating a user for a transaction at a server computer, according to an embodiment of the present invention.

FIG. 9 is a flow diagram illustrating a method 900 for authenticating a user for a transaction at a server computer, according to an embodiment of the present invention. The method 900 is performed by processing logic that may comprise hardware (circuitry, dedicated logic, etc.), software (such as is run on a general purpose computing system or a dedicated machine), firmware (embedded software), or any combination thereof. In certain embodiments, the method 900 is performed by a server computer or plurality of server computers operated by the payment processing network (PPN).

Referring to FIG. 9, the method 900 begins with the payment processing network receiving payment card data and a biometric digital artifact from the consumer device. The payment processing network determines if the biometric digital artifact is valid by forwarding the biometric digital artifact to the server computer (step 420). The server computer may then make the validity determination based on a number of criteria (step 422). For example, the server computer may reject duplicate biometric digital artifact data or biometric digital artifact data that does not comply with the set of criteria. The server computer stores the biometric digital artifact within a user fraud profile database. At step 424, the server computer adjusts a risk score associated with the transaction based on the number of valid biometric digital artifact-based transactions received (and saved in the user fraud profile database) with no associated fraudulent activity. In other words, as more and more transactions are completed using the biometric digital artifact method described herein, the server computer can have increasing confidence that those transactions have been initiated by a valid user. In some embodiments, the risk score is stored in the user fraud profile database. The server computer then sends the determination of whether the received biometric digital artifact is valid to the PPN to facilitate completion of the transaction (step 426).

It should be appreciated that the specific steps illustrated in FIG. 9 provides a particular method for authenticating a user at a server computer, according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 900.

Figure 10:
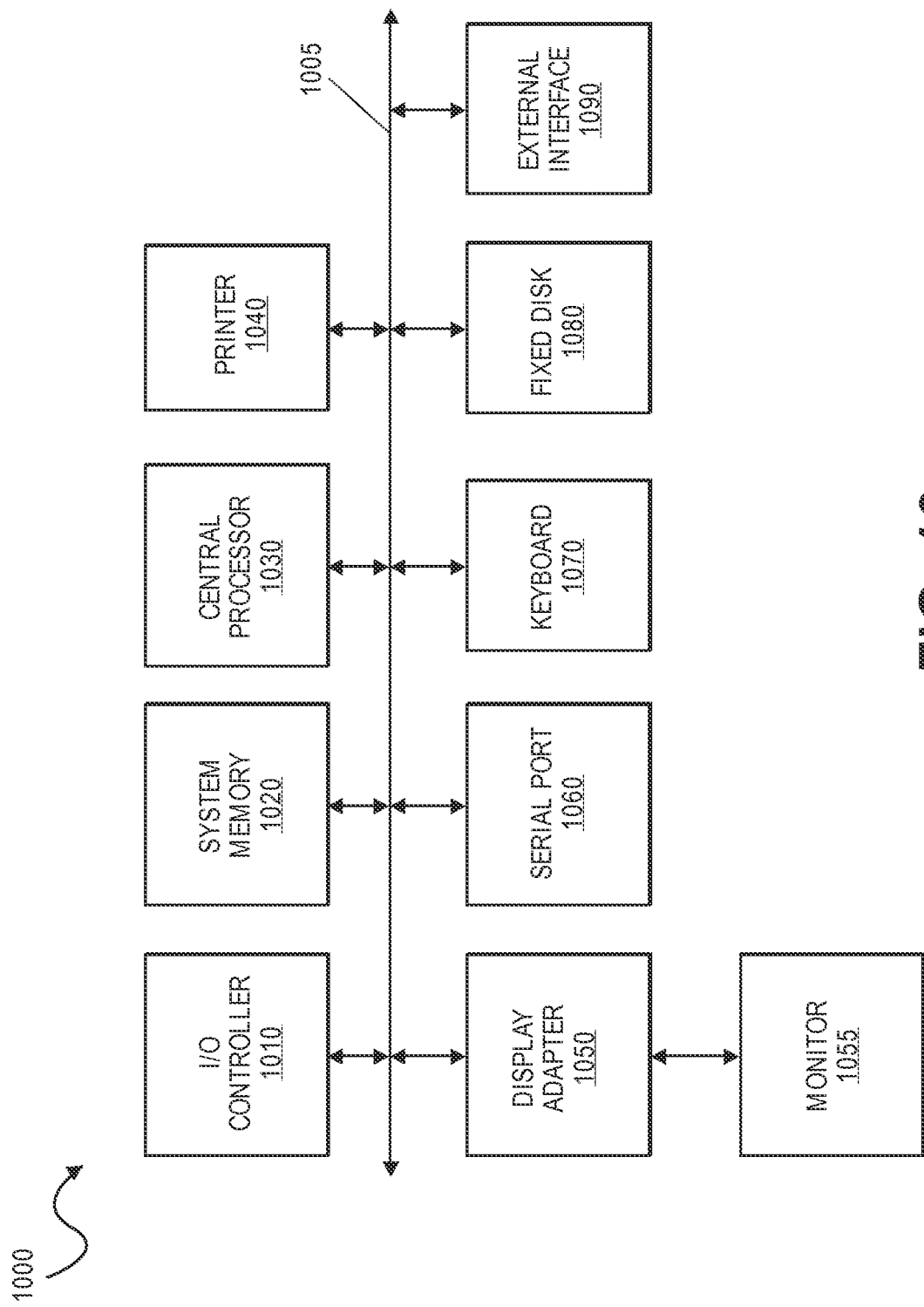
FIG. 10 is a diagram of a computer apparatus, according to an example embodiment.

FIG. 10 is a diagram of a computer apparatus 1000, according to an example embodiment. The various participants and elements in the previously described system diagram (e.g., the consumer device, payment processing network, acquiring bank, issuing bank, etc., in FIG. 1) may use any suitable number of subsystems in the computer apparatus to facilitate the methods and/or functions described herein. Examples of such subsystems or components are shown in FIG. 10. The subsystems shown in FIG. 10 are interconnected via a system bus 1005. Additional subsystems such as a printer 1040, keyboard 1070, fixed disk 1080 (or other memory comprising computer-readable media), monitor 1055, which is coupled to display adapter 1050, and others are shown. Peripherals and input/output (I/O) devices (not shown), which couple to I/O controller 1010, can be connected to the computer system by any number of means known in the art, such as serial port 1060. For example, serial port 1060 or external interface 1090 can be used to connect the computer apparatus to a wide area network such as the Internet, a mouse input device, or a scanner. Alternatively, peripherals can be connected wirelessly (e.g., IR, Bluetooth, etc.). The interconnection via system bus allows the central processor 1030 to communicate with each subsystem and to control the execution of instructions from system memory 1020 or the fixed disk 1080, as well as the exchange of information between subsystems. The system memory 1020 and/or the fixed disk 1080 (e.g., hard disk, solid state drive, etc.) may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

One or more embodiments of the invention may be combined with one or more other embodiments of the invention without departing from the spirit and scope of the invention.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for authenticating a user for a payment transaction, comprising:
    storing, by a server computer, a user fraud profile and a queue;
    associating, by the server computer, a predetermined period of time with the queue;
    receiving, by the server computer and from a device, payment transaction data associated with the payment transaction and a biometric digital artifact;
    comparing, by the server computer, the biometric digital artifact to other biometric digital artifacts stored in the user fraud profile;
    authenticating, by the server computer, the payment transaction based on the comparison;
    sending, by the server computer, an authentication result to the device;
    storing, by the server computer, the biometric digital artifact in the queue;
    determining, by the server computer, that the predetermined period of time associated with the queue has expired;
    retrieving, by the server computer, the biometric digital artifact from the queue based on the determination; and
    updating, by the server computer, the user fraud profile with the retrieved biometric digital artifact.

2. The method of claim 1 further comprising sending the authentication result and the payment transaction data to a transaction completion device to complete the payment transaction.

3. The method of claim 1 wherein the updating further comprises adjusting a risk score based on a number of valid biometric digital artifacts received without fraudulent activity.

4. The method of claim 1 wherein the biometric digital artifact is a cryptographically generated value.

5. The method of claim 2 wherein the user fraud profile is stored within a database of the server computer.

6. The method of claim 1 wherein the biometric digital artifact comprises a digital representation that indicates whether there is a match or correlation between a first user voice sample and a second user voice sample.

7. The method of claim 1 wherein the biometrical digital artifact is generated by the device.

8. A server for authenticating a user for a payment transaction, comprising:
    a processor; and a non-transitory computer-readable storage medium, comprising code executable by the processor for implementing a method comprising:
    storing a user fraud profile and a queue;
    associating a predetermined period of time with the queue;
    receiving, from a device, payment transaction data associated with the payment transaction and a biometric digital artifact;
    comparing the biometric digital artifact to other biometric digital artifacts stored in the user fraud profile;
    authenticating the payment transaction based on the comparison;
    sending an authentication result to the device;
    storing the biometric digital artifact in the queue;
    determining that the predetermined period of time associated with the queue has expired;
    retrieving the biometric digital artifact from the queue based on the determination; and
    updating, by the server computer, the user fraud profile with the retrieved biometric digital artifact.

9. The server of claim 8 wherein the method further comprises sending the authentication result and the payment transaction data to a transaction completion device to complete a transaction.

10. The server of claim 8 wherein the updating further comprises adjusting a risk score based on a number of valid biometric digital artifacts received without fraudulent activity.

11. The server of claim 8 wherein the biometric digital artifact is a cryptographically generated value.

12. The server of claim 8, wherein the user fraud profile is stored within a database of the server.

* * * * *